Jan. 14, 1958  W. W. WALKER  2,819,932
SELF-ALIGNING SHAFT HANGER
Filed June 20, 1955
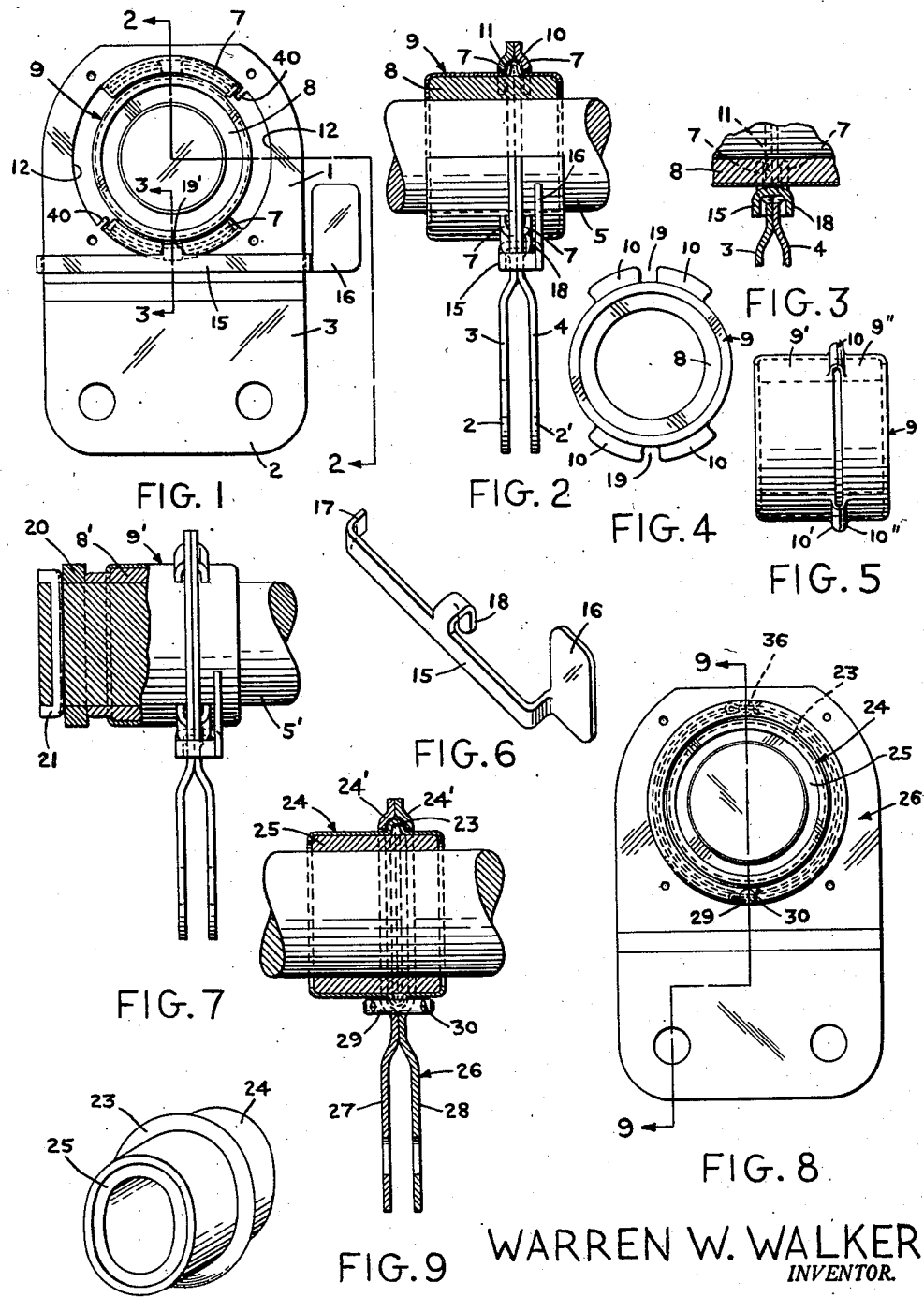
WARREN W. WALKER
INVENTOR.

United States Patent Office 2,819,932
Patented Jan. 14, 1958

2,819,932

SELF-ALIGNING SHAFT HANGER

Warren W. Walker, Montclair, N. J.

Application June 20, 1955, Serial No. 516,368

10 Claims. (Cl. 308—29)

This invention relates to shaft bearings and more particularly to a self-aligning shaft hanger assembly, wherein the shaft bearing includes a graphite metallized bushing, graphite bushing, graphite and metal, ceramic bushing or any other which is self-lubricating, retained in a metal casing or housing and carried by a bearing hanger to form a self-aligning shaft hanger, and one, among other objects of the invention is to provide a shaft hanger assembly of this type, so constructed that the entire assembly may be economically manufactured.

The self-aligning shaft hanger of the present invention embodies a construction which will permit the removal of the bushing and its retaining casing from the hanger assembly for replacement or repair without requiring dismantling of the hanger per se, thus not only saving time and expense in repair of the hanger assembly but permitting economical first cost of manufacture and assembly, in that the parts of the hanger per se may be spotwelded together in lieu of more expensive methods of connecting them, and the bushing and its casing may be quickly and easily positioned in their relation to the hanger.

The self-aligning hanger of the present invention permits the bushing to align with the shaft as the shaft is distorted by load, or the frame is distorted by load and/or heat. The bushing of the present invention may be rotated through 180° to double its active life and embodies means to prevent the bushing from rotating with a shaft extending therethrough.

With these and other objects in view, as may appear from the accompanying specification, the invention consists of various features of construction and combination of parts, which will be first described in connection with the accompanying drawings, showing a self-aligning shaft hanger of a preferred form embodying the invention, and the features forming the invention will be specifically pointed out in the claims.

In the drawings:

Figure 1 is a front elevation of the preferred form of the improved self-aligning shaft hanger assembly.

Figure 2 is a vertical section through the hanger assembly taken on the line 2—2 of Figure 1.

Figure 3 is a detail section taken on line 3—3 of Figure 1.

Figure 4 is an end view of the bushing and its casing.

Figure 5 is a side view of the bushing and its casing.

Figure 6 is a perspective view of a locking key employed in the hanger structure.

Figure 7 is a view partly in elevation and partly in section of a slight modification of the shaft hanger assembly.

Figure 8 is a side elevation of a modified form of the self-aligning shaft hanger assembly.

Figure 9 is a vertical section taken on the line 9—9 of Figure 8.

Figure 10 is a detail perspective view of the bushing and its casing.

Referring more particularly to the drawings, the self-aligning shaft hanger assembly includes the hanger 1 per se which is composed or formed of a pair of flat metal sheets having the end portions 2 and 2' thereof offset laterally and spaced one from the other in parallel relation to form attaching elements on the hanger assembly. The plates 3 and 4 are spotwelded together in flatwise engagement and they are provided with a circular opening extending therethrough which receives the bushing and its casing assembly and through which the shaft shown at 5 extends.

The portions of the metal sheets 3 and 4 surrounding the opening 6 are shaped to form substantially arcuate outwardly curving portions 7, the outwardly curving portion of one plate being in opposed relation to the other and thus forming in combination with each other an inwardly opening substantially semi-circular retaining recess surrounding the shaft and bushing receiving opening in the hanger per se.

The shaft receiving bushing 8 is cylindrical in shape and is formed of a metallized graphite composition, graphite, graphite and metal ceramic or any other suitable material which is self-lubricating and it is enclosed in a metal casing 9. The ends of the metal casing are open, the openings being larger than the internal diameter of the bushing 8, as is clearly shown in Figure 2 of the drawings, so as to allow for wear of the bushing without scoring of the shaft by the metal casing 9 and the end portions of the casing are inturned to hold the bushing securely. The metal casing 9 has outwardly extending substantially semi-circular, in cross section ribs 10 formed thereon which when the hanger unit is assembled fits and rides in the substantially semi-circular recess formed in the hanger per se, thus permitting limited rocking relative movement of the bushing and hanger to provide the self-aligning feature of the hanger assembly. The bushing 8 and its casing 9 are prevented from rotating relative to the hanger by suitable locking means hereinafter described.

As clearly shown in Figures 4 and 5 of the drawings metal casing 9 is formed of two sections 9' and 9". The inner facing ends of the sections 9' and 9" have outwardly extending tongues 10' and 10" respectively formed thereon in spaced pairs, with one pair diametrically opposite to the other pair. These tongues 10' and 10" are shaped so that the outer edges of the aligning sets on each section 9' and 9" engage and form the arcuate ribs 10 which ride in the arcuate substantially semi-circular recess 11 formed by the portions 7.

The features of the hanger assembly just described are embodied in all of the forms of the hanger shown in the drawings and the construction or form of hanger shown in Figures 1 to 7 of the drawings differs from the construction of the hanger assembly shown in Figures 8 to 10 inclusive in the details following.

In the form of the hanger assembly shown in Figures 1 to 7 inclusive of the drawings, the substantially annular outwardly curving portions 7 which form the retaining recess in the hanger per se have portions thereof cut away at circumferentially spaced points about their circumference providing laterally opening spaces such as is clearly shown at 12 in Figures 1 and 7 of the drawings, and the ribs 10 on the casing 9 are of such size that when the ribs 10 are moved to align with the cutout portions 12 the bushing 8 and its retaining casing 9 may be moved longitudinally into position relative to the hanger and then by slight rotation of the bushing and its retaining casing to move the ribs 10 out of alignment with the openings 12 and into longitudinal alignment with the remaining portions of the elements 7 further longitudinal movement of the bushing and its casing will be prevented. This construction not only permits quick, inexpensive assembly of the bushing and hanger but permits quick and easy removal of the bushing and its casing from the hanger for repair or replacement of a worn bushing.

It is desirable, however, to lock the bushing and its casing against rotation relative to the hanger to prevent rotation of the bushing with the shaft 5 so that the bushing 8 will form a bearing for the shaft. Suitable locking means are provided for preventing such relative rotation. This locking means comprises a key 15 cut from flat metal and having an offset hand, or thumb grip 16 formed on one end thereof and a laterally extending tongue 17 formed on its opposite end. A locking tongue 18 is formed on the upper edge of the body of the key 15 intermediate its ends and is bent to assume substantially the shape of an inverted U.

When the bushing 9 is inserted in the opening in the body 1 and rotated to move the ribs 10 out of alignment with the spaces 12 and when the space 19 between the ribs 10 of one set is brought into alignment with the openings 19' cut in the lower arcuate curving portions 7, the locking tongue 18 is inserted through the openings 19' and space 19 and the body of the key 15 is moved to lie flat against the plate 3 thus locking the bushing against rotation relative to the housing, and permitting easy removal of the bushing from the housing by reversing the direction of movement of the key and rotating the bushing to bring the ribs 10 in alignment with the spaces 12.

Stops 40 are formed in any suitable manner, such as by welding, or by cutting from the metal, on one of the plates 2 or 3 and extend into the opening in the body 1, to form stops for limiting the rotary movement of the bushing 8 in the opening.

In Figure 7 of the drawings which consists of a radially loaded bushing with a thrust bearing which will centralize the shaft 5' so that the shaft cannot ride to one side, the bushing 8' is shown as projecting beyond one end of the casing 9' and a thrust collar 20 is mounted about the shaft 5' and abuts the outer end of the bushing 8' thus combining a bushing to take radial and thrust head to centralize the shaft 5'. A key 21 is inserted through the shaft 5' to hold the thrust collar 20 tightly against the end of the bushing 8'.

The construction of the self-aligning shaft hanger assembly shown in Figures 8 to 10 of the drawings differs from the construction shown in Figs. 1 to 7 inclusive of the drawings in that the rib 23 formed on the casing 24 which encloses the bushing 25 is continuous and the outwardly curving portions 24' of the hanger plates 27 and 28 which surround the opening in the hanger per se through which the bushing 25 and the casing 24 extends are also continuous or completely annular and thus the bushing 25 and its casing 24 must be placed in proper position with the annular rib 23 in the annular semi-circular retaining recess before the two plates 27 and 28 of the hanger 26 are connected to each other. In this form of the invention a locking pin 29 is inserted transversely through the annular outwardly curving portions 24' and the rib 23 to prevent rotary movement of the bushing 25 and its casing 24 relative to the hanger per se. The pin 29 may be held against accidental longitudinal displacement by cotter pins 30.

If it is so desired an additional locking pin 36 similar to the pin 29 and with a cotter pin, may be employed to prevent rolling of the bearing.

It will be understood that the invention is not to be limited to the specific construction or arrangement of parts shown, but that they may be widely modified within the invention defined by the claims.

What is claimed is:

1. A self-aligning shaft hanger assembly, comprising a pair of plates attached together in flatwise engagement, said plates provided with a shaft receiving opening extending therethrough, the portions of each of said plates surrounding said opening being shaped to form arcuate outwardly curving portions forming in combination an inwardly opening arcuate substantially semi-circular retaining recess surrounding said shaft receiving opening, portions of said arcuate portions being cut away at diametrically opposed points leaving spaces at each side of the shaft receiving opening and retaining recess portions at diametrically opposed positions relative to the shaft receiving recess, a cylindrical self-lubricating bushing, a casing enclosing said bushing and having its ends open, pairs of radiating tongues formed on said casing in diametrically opposed pairs, the distance between the outer end edges of the tongues of each pair being less than the length of the cut away portions of the arcuate portions to permit the casing and bushing to be partially inserted through said shaft receiving opening and rotated slightly to move said tongues into said retaining recess portions, and locking means for preventing rotary movement of the casing relative to the hanger.

2. A self-aligning shaft hanger assembly as claimed in claim 1, including stop members carried by said plates and extending into the spaces formed by cutting away portions of said arcuate portions to limit the rotary movement of the bushing and casing relative to said plates.

3. A self-aligning shaft hanger assembly as claimed in claim 1, wherein said locking means comprises means removably engaging said plates and movable into and out of engagement with certain of said tongues.

4. A self-aligning shaft hanger assembly as claimed in claim 1, wherein the tongues of each pair are spaced slightly from each other at their facing ends, and said locking means includes a key removably engaging said plates and having a tongue formed thereon for engagement over one of said arcuate portions and between the facing ends of a pair of said tongues.

5. A self-aligning shaft hanger as claimed in claim 4, including stop members extending into the spaces formed by cutting away portions of said arcuate portions to limit the rotary movement of the bushing and casing relative to said plates upon insertion of the bushing and casing through said shaft receiving opening and position said tongues for engagement by said locking key.

6. A self-aligning shaft hanger assembly as claimed in claim 1, wherein said bushing enclosing casing is formed of two cylindrical sections in end to end engagement, the facing engaging ends of said sections having laterally extending tongues formed thereon in pairs, the tongues of one section engaging the tongues of the other section and forming ribs for riding in said arcuate substantially semi-circular recess.

7. A self-aligning shaft hanger assembly as claimed in claim 1, wherein said locking means includes a key removably engaging said plate and having a tongue formed thereon for engagement over one of said arcuate portions and in engagement with certain of said tongues.

8. A self-aligning shaft hanger assembly as claimed in claim 7, including a thrust collar in endwise abutting engagement with one end of said bushing, and means for holding said thrust collar in place.

9. A self-aligning shaft hanger assembly as claimed in claim 1 including a thrust collar in endwise abutting engagement with the one end of the bushing, and means for holding said thrust collar in place.

10. A self-aligning shaft hanger assembly as claimed in claim 1 wherein said locking means comprises a locking pin inserted through said rib and said substantially annular outwardly curving portions of said hanger.

References Cited in the file of this patent

UNITED STATES PATENTS

| | | |
|---|---|---|
| 694,043 | Wideman | Feb. 25, 1902 |
| 1,019,424 | Clough | Mar. 5, 1912 |
| 2,484,725 | Parker | Oct. 11, 1949 |

FOREIGN PATENTS

| | | |
|---|---|---|
| 8,465 | Great Britain | A. D. 1908 |